Figure 4:
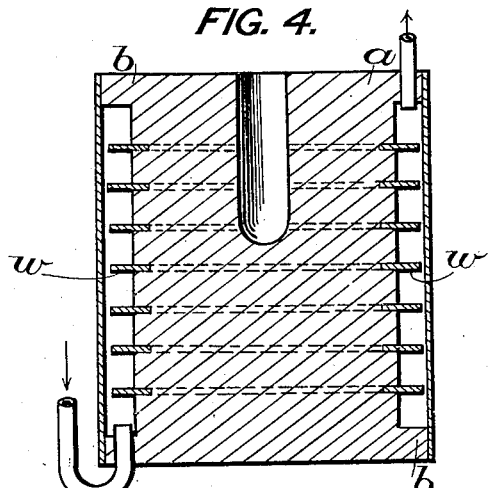

G. G. BELL.
APPARATUS FOR HEATING WATER AND OTHER LIQUIDS OR FLUIDS.
APPLICATION FILED DEC. 17, 1910.
1,069,372.
Patented Aug. 5, 1913.
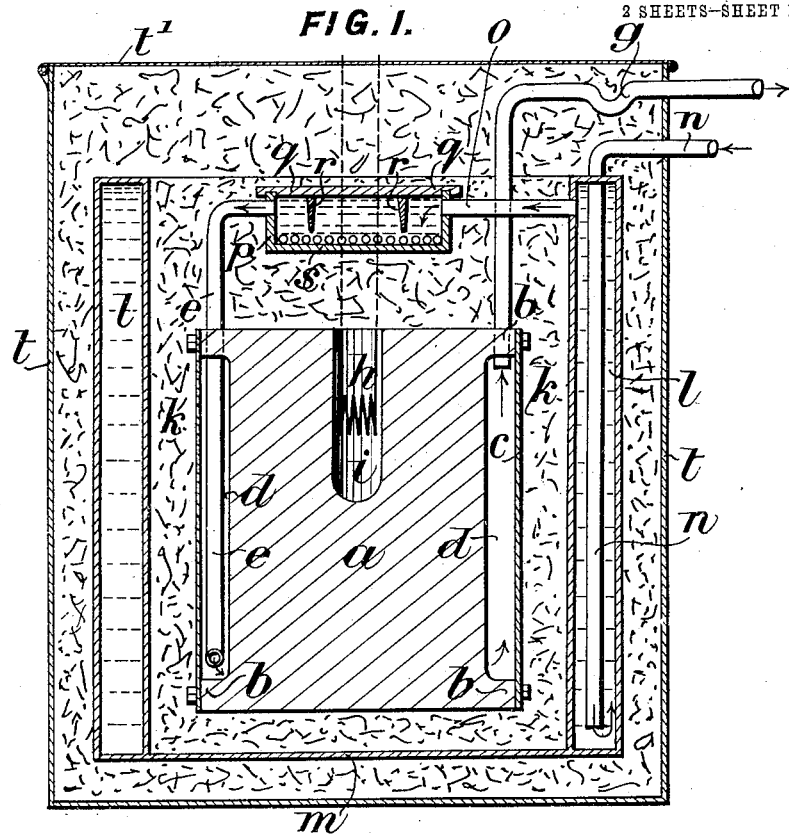
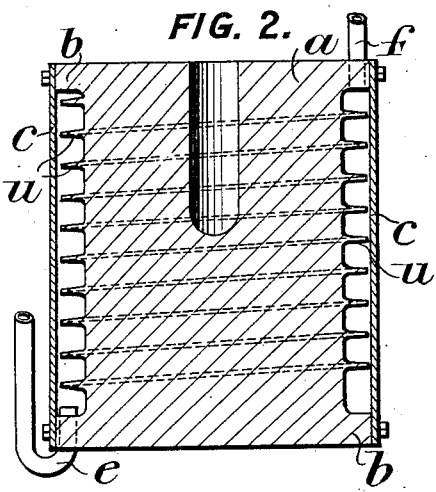
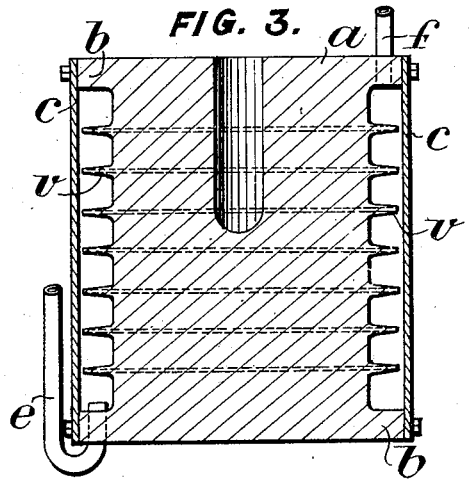

G. G. BELL.
APPARATUS FOR HEATING WATER AND OTHER LIQUIDS OR FLUIDS.
APPLICATION FILED DEC. 17, 1910.

1,069,372.

Patented Aug. 5, 1913.

2 SHEETS—SHEET 2.

Witnesses
B. V. Dommers
M. W. Darq

Inventor
George Gilbert Bell,
By Henry Ort Jr.
Atty

UNITED STATES PATENT OFFICE.

GEORGE GILBERT BELL, OF KENSINGTON, ENGLAND, ASSIGNOR, BY MESNE ASSIGNMENTS, TO ELECTRIC HEAT STORAGE COMPANY, A CORPORATION OF NEW YORK.

APPARATUS FOR HEATING WATER AND OTHER LIQUIDS OR FLUIDS.

1,069,372. Specification of Letters Patent. Patented Aug. 5, 1913.

Application filed December 17, 1910. Serial No. 597,924.

*To all whom it may concern:*

Be it known that I, GEORGE GILBERT BELL, a subject of the King of Great Britain, residing at No. 14 Addison Court Gardens, Kensington, in the county of Middlesex, England, have invented new and useful Improvements in Apparatus for Heating Water and other Liquids or Fluids, of which the following is a specification.

This invention relates to improvements in apparatus for heating water and other liquids or fluids or media of the type in which a mass of a material such as iron capable of storing heat and being also a good conductor of heat, is heated electrically, such mass being also capable of imparting as and when required such stored heat to the medium to be heated, be it fluid, liquid or solid.

According to this invention the thermal storage mass which is preferably made of iron or other similar material having a high specific or latent heat value, is provided with an external chamber the outer surface of the mass forming the inner wall of the chamber, which external chamber is adapted to receive the water or other medium, so that what heat does escape from the hot mass will heat the fluid and will not be lost, and this external vessel may also be provided with a heat insulating coating or jacket. The thermal mass formed with the external chamber is moreover inclosed in a jacket of heat insulating material, or the latter may consist of a vacuum jacket and the internal and external surfaces of the jacket or coating may be polished or silvered to minimize radiation in known manner. The mass of material in which the heat is stored may be of any suitable size and shape, and it may be spherical so that it has the least surface for its volume, and the leakage of heat through the insulating jacket or coating is therefore a minimum, but from a practical point of view it has been found convenient to make it cylindrical in which case the external chamber is conveniently made annular. The electrical energy may be supplied either continuously or during those hours of the day when it can be purchased most cheaply, and may heat the mass of iron or other material by means of a heating coil or by any suitable means. The jacket of heat insulating material may also contain an annular or otherwise suitably formed preliminary heating chamber connected to the supply of water or other medium, and in order that deleterious matter such as lime or the like (contained in the water) may be precipitated from the water before the latter arrives in the heating chamber, an inclosed intermediate vessel or chamber is employed in which precipitation takes place. It is also evident that a filter or other means of purification may be employed in connection with this apparatus if desired. When the medium to be heated is of the nature of a fluid, it may be passed through the hot mass either by an applied pressure or by the natural circulation due to convection. The thermal storage mass when made cylindrical is suitably provided with a flange at each end and a thin sleeve of metal or other suitable material is placed around the cylindrical mass and fixed to the flanges by welding, bolting or otherwise so as to form a jacket around and concentric with the mass. The annular space between the mass and the jacket forms the heating chamber for the medium to be heated and the said chamber is provided with an inlet and an outlet for the passage in and out of the medium, the outlet being provided with a trap whence it passes to a mixing valve. The cylindrical mass, where the heating chamber is formed, may be provided with a helical fin, the external diameter of which preferably fits into the interior of the metal sleeve and the water or other medium entering at the bottom is thus forced to take a circuitous course in its passage through the heating chamber, toward the outlet. The block may also be cast with radiating projections, flanges or fins, which may be annular, such projections being either of cast or wrought iron to assist in the rapid heating of the water by bringing the heat out into the body of the water in the heating chamber or space more rapidly. Or instead of providing the thermal mass with a flange at each end, it may be so provided at one end only, while the cylindrical sleeve, forming the jacket or outer wall of the heating chamber has an outwardly projecting flange at one end which is adapted to be bolted or otherwise fixed to the flange on the mass, while the other end of the jacket is provided with an inwardly projecting flange which is bolted or otherwise fixed to the flangeless end of the mass. Or the sleeve or jacket may be fixed to the cylindrical mass in any other convenient manner. The mass is provided with an electric heating coil or coils preferably wholly or partially mounted in a recess at one end thereof. And in order that this invention may be more readily understood, it will be hereinafter described with reference to the accompanying drawings of which:—

Figure 1 is a vertical section of a thermal storage apparatus for liquid or other fluid. Fig. 2 is a vertical sectional elevation of a modified form of the thermal storage mass and heating chamber. Figs. 3, 4, 5, and 6 are similar views of other modifications.

Figure 5:
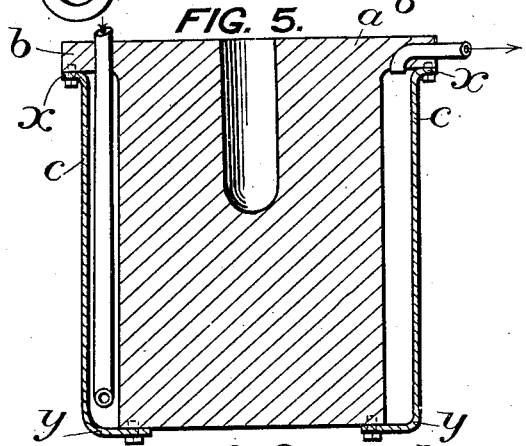

According to one construction and referring more particularly to Fig. 1, the thermal storage mass $a$, is provided with a flange $b$, at each end, and a thin sleeve $c$ of metal, or other suitable material is placed around the cylindrical mass, $a$, and fixed to the flanges, $b$, by welding, bolting, or otherwise, so as to form a jacket around and concentric with the mass. The annular space between the mass, $a$, and the jacket, $c$, forms the heating chamber, $d$, for the medium to be heated, and the inlet may consist of a pipe, $e$, passing in at the top and reaching nearly to the bottom, or it may enter at the bottom while the outlet, $f$, is at the top and may be provided with a trap $g$, whence it passes to a mixing valve. The thermal storage block or mass, $a$, is provided with an electric heating coil or coils $h$, wholly or partially mounted in a recess, $i$, at one end thereof. The block, $a$, is surrounded by a jacket of heat insulating material, $k$, and the latter again is surrounded by an inclosed annular tank, $l$, which is closed at the bottom by a circular plate, $m$, the whole being similarly insulated, the object of the bottom plate being to prevent any leakage of heat downward, as any heat striking it, is communicated to the annular tank, $l$. The latter is connected to the water supply by the pipe, $n$, and in order to promote circulation, the inlet from the water supply, is at, or opens at the bottom of the annular tank, and, if desired, the water may be caused to assume a circuitous route from the bottom upward. The upper end of the annular tank, $l$, has an outlet which may connect directly by the pipes, $o$ and $e$, with the annular heating chamber, $d$, around the thermal storage mass, or, as shown, there is an intermediate precipitating chamber mounted in the insulating jacket, $k$, between the annular tank, $d$, and the external heating chamber, $l$, of the thermal heater, to prevent the formation of scale or fur due to hard water. This precipitating chamber suitably consists of a box, $p$, with a removable cover or manhole $q$, having depending divisions or fins, $r$, fitting watertight at the sides and reaching nearly to the bottom, and the latter may have a number of projections, or the bottom may be more or less covered with marbles, $s$. The water in this precipitating chamber, $p$, will be raised to boiling point, and as any lime or the like contained therein will be thrown down or settle, it follows that only pure soft water will pass to the heating chamber, $d$, surrounding the thermal heater $a$. As the precipitating chamber is capable of being opened by removing the insulating material above it, it may be inspected and cleared out when necessary. The whole apparatus is preferably inclosed in a sheet metal casing $t$, with a lid or cover, $t^1$, and if the annular heating chamber around the thermal heater should become choked or foul, it may be easily removed, taken to pieces, put in working order, and replaced. Or, as shown in Fig. 2, the cylindrical mass, $a$, may be provided with a helical fin, $u$, the external diameter of which may fit into the interior of the metal sleeve, $c$, and the water or other medium entering at the bottom is thus forced to take a circuitous course in its passage through the chamber toward the outlet, $f$. Or, as shown in Fig. 3, the block $a$, may also be cast with parallel radiating projections, flanges, or fins $v$, which may be annular, such projections being either of cast or wrought iron to assist in the rapid heating of the water by bringing the heat out into the body of the water in the annular space more rapidly. The radiating flanges may if desired, be made of wrought iron instead of cast iron, which forms the material of the heat storage mass. Such flanges, as shown at $w$, in Fig. 4, are made of wrought iron and are combined with the mass during the molding operation. This makes a perfect metal-to-metal joint for the transfer of heat to the iron flanges formed by the said rings. Or instead of providing the mass, $a$, with a flange, $b$, at each end as shown in Fig. 1, it may be so provided at one end only as shown in Fig. 5, while the cylindrical sleeve, $c$, forming the jacket has an outwardly projecting flange, $x$, at one end which is adapted to be bolted or otherwise fixed to the flange, $b$, on the mass, while the other end of the jacket is provided with an inwardly projecting flange $y$, which is bolted or otherwise fixed to the flangeless end of the mass, $a$. Or the sleeve or jacket may be fixed to the cylindrical mass in any other convenient manner.

Figure 6:
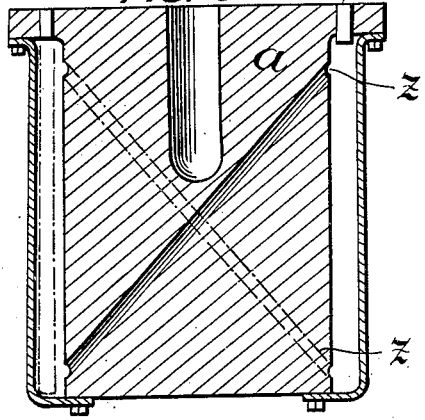

The thermal storage mass or block may be more or less solid, as in the previous construction, or as shown in Fig. 6 it may be provided with a passage or passages, $z$, through same for the passage of the liquid.

It will be understood that the figures illustrate typical forms of apparatus for storing electrically generated heat and imparting such heat to any medium as and when required, and that many variations are possible without departing from the invention.

What I claim as my invention, and desire to secure by Letters Patent is:—

1. In apparatus for heating liquids, the combination of a heat storage mass, means for heating it, the heat storage mass being provided with an external space for heating the liquid by means of the heat stored in the heat storage mass, an external wall for the said space, heat insulating material surrounding said wall and the heat storage mass, a preliminary heating chamber, a pipe connecting the said chamber to the external space of the heat storage mass for supplying partially heated water thereto, and an outlet from the said space for the discharge of the highly heated water.

2. In apparatus for heating liquids, the combination of a heat storage mass, means for heating it, the heat storage mass being provided with an external space for heating the liquid by means of the heat stored in the heat storage mass, an external wall for the said space, heat insulating material surrounding said wall and the heat storage mass, a preliminary heating chamber, a pipe connecting the said chamber to the external space of the heat storage mass for supplying partially heated water thereto, and an outlet from the said space for the discharge of the highly heated water, the pipe connecting the preliminary heating chamber with the said space opening into the latter near the bottom of the same, and the outlet pipe opening from the said space near the top thereof.

3. In apparatus for heating liquids, the combination of a heat storage mass, means for heating it, the heat storage mass being provided with an external space for heating the liquid by means of the heat stored in the heat storage mass, an external wall for the said space, heat insulating material surrounding said wall and the heat storage mass, a preliminary heating chamber, a pipe connecting the said chamber to the external space of the heat storage mass for supplying partially heated water thereto, and an outlet from the said space for the discharge of the highly heated water, and projections extending from the heat storage mass into the external heating space for the liquid.

4. In apparatus for heating liquids, the combination of a heat storage mass provided with an external heating chamber, and provided with a spirally arranged rib or projection extending into the said space, insulating material surrounding the heat storage mass and space, means for supplying liquid to the space opening into the lower part thereof, and an outlet for the discharge of the heated liquid leading from the upper part of the said space.

5. The combination of a heat storage mass provided with an external heating chamber and radial projections extending into said space, means for insulating the heat storage mass and the said space, means for supplying liquid to the space near the bottom, and an outlet for the discharge of the liquid from the upper part of said space.

6. The combination of a heat storage mass containing a space for the liquid to be heated, means for heating the mass so as to heat the liquid to a high temperature, a preliminary heating chamber for partially heating the liquid, means for leading the partially heated water from the preliminary heating chamber to the space in the heat storage mass, and a precipitating chamber in the line of such means for precipitating impurities from the liquid, the precipitating chamber containing obstacles to the flow of the liquid to assist in the precipitation of the impurities.

7. The combination of a heat storage mass containing a space for the liquid to be heated, means for heating the mass so as to heat the liquid to a high temperature, a preliminary heating chamber for partially heating the liquid, means for leading the partially heated water from the preliminary heating chamber to the space in the heat storage mass, and a precipitating chamber in the line of such means for precipitating impurities from the liquid, the precipitating chamber containing marbles and projections for impeding the flow of the liquid to assist in precipitating the impurities.

8. The combination of a heat storage mass containing a space for heating water to a high temperature, electrical heating means for heating the storage mass, a preliminary heating chamber for partially heating the water, a supply pipe connecting with the chamber near the bottom for supplying cold water thereto, an outlet pipe near the top of the said chamber for conveying the partially heated water to a precipitating chamber, a precipitating chamber provided with obstacles for impeding the flow of the partially heated water to precipitate lime and other impurities therefrom, an outlet from the precipitating chamber connecting with the space in the heat storage mass, and an outlet from the said space for the discharge of highly heated water.

9. The combination of a heat storage mass provided with a space for heating liquid, electrical heating means therefor, a preliminary heating chamber for partially heating the water surrounding the heat storage mass, a supply pipe therefor opening into the chamber near the bottom, an outlet pipe for the preliminary heating chamber leading from near the top of said chamber and opening near the bottom of the space in the heat storage mass, an outlet pipe for the said space leading from the space near the top thereof for the discharge of the highly heated water, insulating material surrounding all of the parts, and a metal plate connecting together the different parts of the surrounding preliminary heating chamber at the bottom, and passing beneath the heat storage mass for conducting heat escaping from the heat storage mass to the preliminary heating chamber.

10. The combination of a heat storage mass provided with a space for heating liquid, electrical heating means therefor, a preliminary heating chamber for partially heating the water surrounding the heat storage mass, a connection for carrying the water from the preliminary heating chamber to the heating space in the heat storage mass, an outlet for the discharge of the water from the latter space, insulating material surrounding all of the parts, and a metallic plate connecting together the different parts of the surrounding preliminary heating chamber and passing close to the heat storage mass for conducting heat escaping from the heat storage mass to the preliminary heating chamber.

In testimony whereof I have signed my name to this specification in the presence of two subscribing witnesses.

GEORGE GILBERT BELL.

Witnesses:
C. A. A. JENSEN,
RIPLEY WILSON.